UNITED STATES PATENT OFFICE.

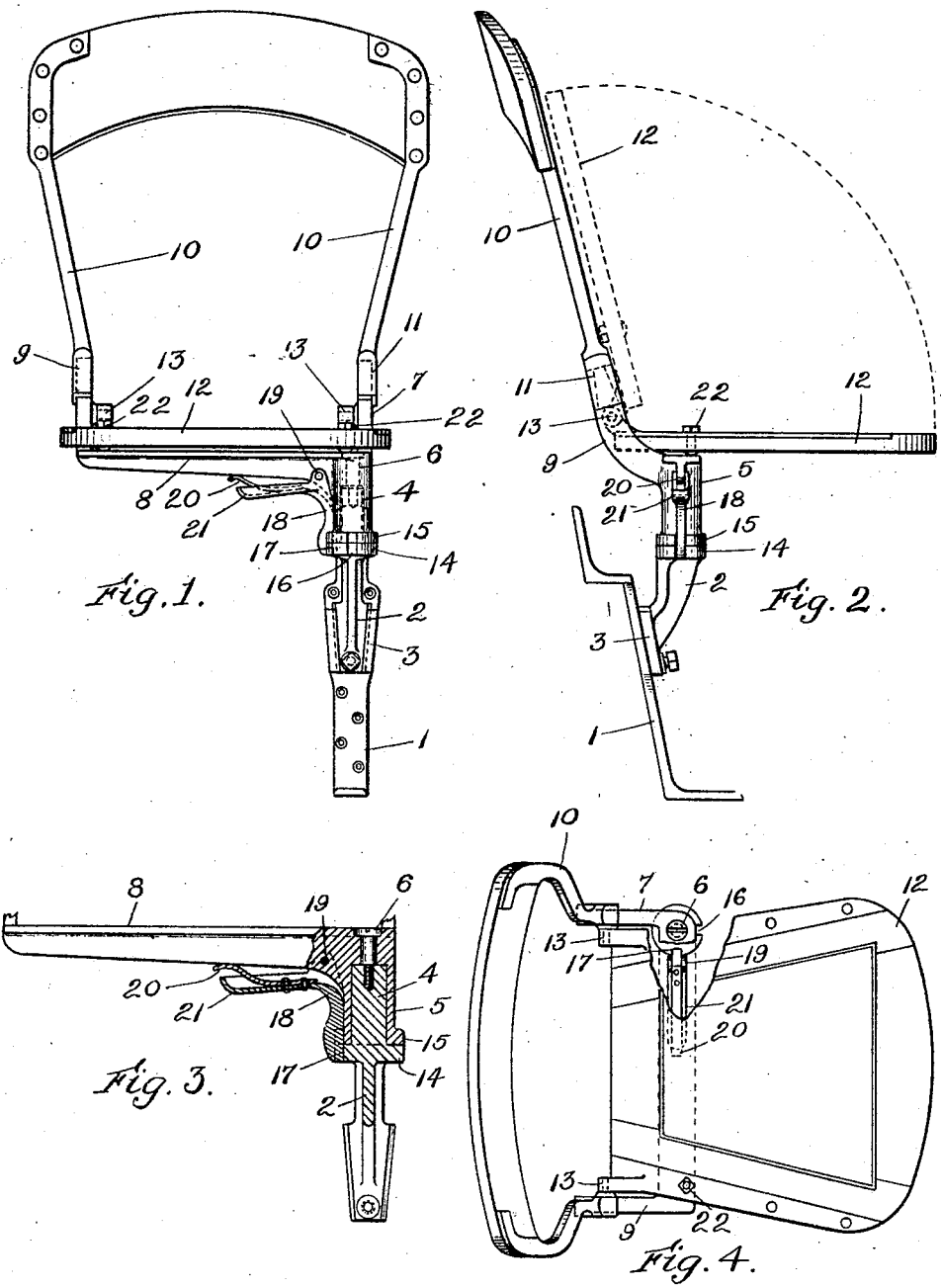

WILLIAM MILLER, OF AMESBURY, MASSACHUSETTS, ASSIGNOR TO WILLIAM E. BIDDLE AND ROBERT H. HILLS, A COPARTNERSHIP DOING BUSINESS UNDER THE NAME OF AMESBURY BRASS & FOUNDRY COMPANY, OF AMESBURY, MASSACHUSETTS.

VEHICLE-SEAT AND LOCK THEREFOR.

1,007,041.  Specification of Letters Patent.  Patented Oct. 24, 1911.

Application filed December 27, 1910. Serial No. 599,624.

*To all whom it may concern:*

Be it known that I, WILLIAM MILLER, a citizen of the United States, residing at Amesbury, in the county of Essex and State of Massachusetts, have invented an Improvement in Vehicle-Seats and Locks Therefor, of which the following description, in connection with the accompanying drawings, is a specification, like letters on the drawings representing like parts.

This invention relates to vehicle seats and locking devices therefor, and while it obviously has other and general fields of usefulness, is especially directed to improvements in auxiliary seats for automobiles.

In the larger automobiles, as limousines, landaulets and touring cars, it is customary to provide in addition to the main fixed transverse seats, one or more auxiliary seats usually fixed to the side of the vehicle to provide additional carrying capacity.

One of the prime objects is to produce an auxiliary seat with a lock which will hold the same firmly and rigidly when the seat is in lowered position for use, the lock being in a position so as to be not then liable to casual or accidental disengagement but being in such a position that when the seat is raised it is convenient for manipulation.

The invention will be understood by reference to the accompanying drawings, wherein a preferred embodiment thereof is illustrated.

In the drawings, Figure 1 is a front elevation of the improved seat with the locking attachment and its support; Fig. 2 is a side elevation thereof; Fig. 3 is a vertical section of the base portion, partly in elevation; and Fig. 4 is a plan view of the seat.

A support 1 suitably formed to be firmly secured to the side of the automobile body, usually in oblique position, carries a bracket base 2 for the seat, these parts being removably interengaged by a bayonet or tapered dove-tail lip joint 3 as shown. The bracket base 2 has an upstanding journal stud 4 on which is pivoted the seat frame 5, these parts being held in their assembled journaled relation by a screw bolt 6. This seat frame has a backwardly curved upstanding projection 7 to carry one side of the seat, and a transverse horizontal ribbed arm 8 extending nearly the full width of the seat and having at its outer end a backwardly curved upstanding projection 9 similar to the projection 7. A suitable seat backing 10 is bolted or otherwise fixed, as at 11, to these projections, and the seat 12 is also pivoted thereto at 13. The bracket base 2 and the seat frame 5 have enlarged bearing flanges 14, 15, respectively to coöperate with the stud bearing 4 in providing a firm, substantial swivel support for the seat. The flange 14 has two notches 16, 17 formed therein ninety degrees apart, and into one or the other of these a lock 18 pivoted to the arm 8 at 19 is adapted to engage, and when so engaged is held in locking position by a spring 20; the notch 17 as shown coöperating to hold the seat in transverse position for use, and the notch 16 receiving the lock 18 when the seat is turned around alongside the vehicle body to be out of the way. The lock 18 is formed as an L-shaped member, and its handle portion 21 extends along underneath the arm 8 so as to be in position for convenient manipulation and at the same time protected from injury.

It is to be observed that by reason of the backward incline of the seat-holding projections 7, 9, the pivots 13 of the seat are at some little distance back of the strong ribbed arm 8 upon which the seat rests, as shown at 22 some distance forward of the pivots. The ribbed arm 8 therefore serves a three-fold purpose of a carrier for the outer whole construction as set forth forms a support for the seat when lowered, and a carrier and protector for the lock 18. The whole construction as set forth forms a strong reliable auxiliary seat, while the locking device is in a particularly convenient and readily accessible position and at the same time so located that it is not apt to receive accidental injury.

The arrangement of the lock pivoted on the arm 8 near the back of the seat and with its operating handle extending out toward the transverse center of the seat, provides a construction whereby the lock is secured from casual or accidental disengagement when the seat is in lowered position, the handle then being in a position where it can be gotten at only with great difficulty; thus the seat frame is held rigidly and with certainty in its transverse position for use, when the seat is lowered. On the other hand, when the seat is swung up to its vertical inoperative position, the locking handle 21 is in position where it can be gotten at with facility to unlock the seat frame and enable it to be turned around sidewise with the car.

Having described my invention, what I claim as new and desire to secure by Letters Patent is,—

1. A vehicle seat, comprising a base adapted to be secured to the side of a vehicle with an upstanding portion formed to permit angular adjustment of a seat frame thereon, a seat frame composed of a member formed with a vertical journal connection for fitting said base and with a horizontal seat supporting arm extending from said connection, a seat hinged to said frame, and means for locking said frame in different angular positions to said base, said means consisting in a member having spaced apart recesses carried by said base and a lock coöperative with a selective one of said recesses, said lock being pivoted adjacent the junction of said horizontal arm with said vertical connection and extending thence downward to engage one of said recesses with a handle extending in the other direction along under the horizontal supporting arm of said frame.

2. A vehicle seat, comprising a base adapted to be secured to the side of a vehicle with an upstanding portion formed to permit angular adjustment of a seat frame thereon, a seat frame composed of a member formed with a vertical journal connection for fitting said base and with a horizontal seat supporting arm extending from said connection, a seat hinged to said frame, and means for locking said frame in different angular positions to said base, said means consisting in a notched flange formed with said base and a substantially L-shaped locking lever pivoted adjacent the junction of said seat supporting arm with said journal connection and extending thence in one direction downward to engage a notch in said flange, and in the other direction along underneath said horizontal seat supporting arm with a spring interposed to normally hold the parts in locking engagement.

In testimony whereof, I have signed my name to this specification, in the presence of two subscribing witnesses.

WILLIAM MILLER.

Witnesses:
 MABEL F. WHITE,
 LENA C. MORRILL.